United States Patent

Ostrovsky et al.

(10) Patent No.: US 9,608,533 B2
(45) Date of Patent: Mar. 28, 2017

(54) PHASE CONTROL WITH ADAPTIVE PARAMETERS

(71) Applicant: Leviton Manufacturing Co., Inc., Melville, NY (US)

(72) Inventors: Michael Ostrovsky, Brooklyn, NY (US); John LiBretto, North Massapequa, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 250 days.

(21) Appl. No.: 14/138,868

(22) Filed: Dec. 23, 2013

(65) Prior Publication Data

US 2014/0111119 A1   Apr. 24, 2014

Related U.S. Application Data

(63) Continuation of application No. 12/650,420, filed on Dec. 30, 2009, now Pat. No. 8,618,751.

(51) Int. Cl.
| | |
|---|---|
| *H05B 33/08* | (2006.01) |
| *H02M 5/257* | (2006.01) |
| *H05B 39/08* | (2006.01) |
| *H02M 5/293* | (2006.01) |
| *H02M 5/34* | (2006.01) |
| *H05B 37/02* | (2006.01) |

(52) U.S. Cl.
CPC ......... *H02M 5/2573* (2013.01); *H02M 5/293* (2013.01); *H02M 5/34* (2013.01); *H05B 37/02* (2013.01); *H05B 39/083* (2013.01); *Y10T 307/937* (2015.04)

(58) Field of Classification Search
USPC ... 315/186, 193, 200 R, 291, 297, 307, 308, 315/362
See application file for complete search history.

(56) References Cited

U.S. PATENT DOCUMENTS

| | | |
|---|---|---|
| 3,218,511 A | 4/1961 | Rosenbaum |
| 3,935,505 A | 1/1976 | Spiteri |
| 4,396,869 A | 8/1983 | Rosenbaum et al. |

(Continued)

FOREIGN PATENT DOCUMENTS

| | | |
|---|---|---|
| EP | 1965611 A1 | 9/2008 |
| WO | 2009127340 | 10/2009 |

OTHER PUBLICATIONS

Leviton—Technical Application Note—"Programming Guide for Vizia + Dimmers and Quiet Fan Speed Control," 2008, 4 pages.

(Continued)

*Primary Examiner* — Douglas W Owens
*Assistant Examiner* — Jianzi Chen
(74) *Attorney, Agent, or Firm* — Marger Johnson

(57) ABSTRACT

An apparatus to control an amount of current delivered from an AC power source to an electrical load includes a line terminal configured to be connected to the AC power source, a load terminal configured to be connected to the electrical load, a controllably conductive power switch in series electrical connection between the line terminal and the load terminal, and a switching circuit configured to control a conductive state of the controllably conductive power switch wherein the switching circuit is configured to automatically detect at least one electrical characteristic.

24 Claims, 10 Drawing Sheets

(56) References Cited

U.S. PATENT DOCUMENTS

| | | |
|---|---|---|
| 4,651,060 A | 3/1987 | Clark |
| 5,001,386 A | 3/1991 | Sullivan et al. |
| 5,004,957 A | 4/1991 | Cunningham |
| 5,041,763 A | 8/1991 | Sullivan et al. |
| 5,144,205 A | 9/1992 | Motto et al. |
| 5,173,643 A | 12/1992 | Sullivan et al. |
| 5,327,047 A | 7/1994 | Gershen |
| 5,619,081 A | 4/1997 | Gershen et al. |
| 5,684,376 A | 11/1997 | Neiger et al. |
| 5,686,799 A | 11/1997 | Moisin et al. |
| 5,719,471 A | 2/1998 | Kachmarik |
| 5,789,894 A | 8/1998 | Neiger et al. |
| 5,798,617 A | 8/1998 | Moisin |
| 5,841,238 A | 11/1998 | Van Veldhuizen et al. |
| 5,841,239 A | 11/1998 | Sullivan et al. |
| 5,854,519 A | 12/1998 | Gershen et al. |
| 5,864,212 A | 1/1999 | Sullivan |
| 5,866,993 A | 2/1999 | Moisin |
| 5,955,841 A | 9/1999 | Moisin et al. |
| 5,994,848 A | 11/1999 | Janczak |
| 6,011,357 A | 1/2000 | Gradzki et al. |
| 6,043,611 A | 3/2000 | Gradzki et al. |
| 6,133,696 A | 10/2000 | Tavares et al. |
| 6,153,984 A | 11/2000 | Fishbein et al. |
| 6,175,195 B1 | 1/2001 | Janczak et al. |
| 6,400,098 B1 | 6/2002 | Pun |
| 6,452,344 B1 | 9/2002 | MacAdam et al. |
| 6,577,076 B2 | 6/2003 | Li et al. |
| 6,603,274 B2 | 8/2003 | Ribarich et al. |
| 6,642,669 B1 | 11/2003 | MacAdam et al. |
| 6,727,665 B2 | 4/2004 | Yao |
| 7,088,059 B2 | 8/2006 | McKinney et al. |
| 7,102,902 B1 | 9/2006 | Brown et al. |
| 7,109,665 B2 | 9/2006 | Green |
| 7,110,225 B1 | 9/2006 | Hick |
| 7,132,802 B2 | 11/2006 | Fischer et al. |
| 7,164,238 B2 | 1/2007 | Kazanov et al. |
| 7,224,125 B2 | 5/2007 | Ribarich |
| 7,242,563 B2 | 7/2007 | Hua et al. |
| 7,288,902 B1 | 10/2007 | Melanson |
| 7,329,996 B2 | 2/2008 | Hsu |
| 7,482,756 B2 | 1/2009 | Kesterson |
| 7,667,408 B2 | 2/2010 | Melanson et al. |
| 7,759,881 B1 | 7/2010 | Melanson |
| 7,852,017 B1 | 12/2010 | Melanson |
| 2002/0140373 A1 | 10/2002 | Ribarich et al. |
| 2003/0112083 A1 | 6/2003 | Atallah et al. |
| 2003/0222604 A1 | 12/2003 | Yao |
| 2004/0032222 A1 | 2/2004 | Green |
| 2004/0207337 A1 | 10/2004 | Fischer et al. |
| 2005/0104543 A1 | 5/2005 | Kazanov et al. |
| 2006/0023002 A1 | 2/2006 | Hara et al. |
| 2009/0108765 A1 | 4/2009 | Weightman et al. |
| 2010/0270948 A1 | 10/2010 | Wang et al. |
| 2011/0037323 A1 | 2/2011 | Buerer |
| 2011/0062933 A1 | 3/2011 | Tosuntikool et al. |
| 2011/0109297 A1 | 5/2011 | Tosuntikool |
| 2011/0115448 A1 | 5/2011 | Elliott et al. |
| 2011/0115460 A1 | 5/2011 | Elliott et al. |
| 2011/0118890 A1* | 5/2011 | Parsons .................. H02J 3/14 700/295 |
| 2011/0121752 A1 | 5/2011 | Newman et al. |
| 2011/0133656 A1 | 6/2011 | Balasubramanian |
| 2012/0033471 A1 | 2/2012 | Newman |
| 2012/0230073 A1 | 9/2012 | Newman et al. |

OTHER PUBLICATIONS

Leviton—Universal Dimmer (Single Pole or 3 Way), Cat. No. HCM06-ID (lighted), Dec. 29, 2009, 2 pages.

Littelfuse, Inc., AN1002—Teccor Brand Thyristors, "Gating, Latching, and Holding of SCRs and Triacs," 2008, 5 pages.

Littelfuse, Inc., AN1003—Teccor Brand Thyristors, "Phase Control Using Thyristors," 2008, 9 pages.

AN2841 Application Note "LED Dimming Implemented or STM32TM Microcontroller," STMicroelectronics, 2008, 31 pages.

Gulati, Anshul, "Modulating Techniques for LED Dimming" Cypress Perform, Oct. 22, 2008, 10 pages.

Rosen, Rich, "Dimming Techniques for Switched-Mode Led Drivers," Power designer, National Semiconductor, 7 pages.

International Preliminary Report on Patentability for Application PCT/US2010/052145, dated Jul. 4, 2012, 8 pages.

International Search Report/Written Opinion for Application PCT/US2010/052145, dated Jun. 28, 2011, 11 pages.

* cited by examiner

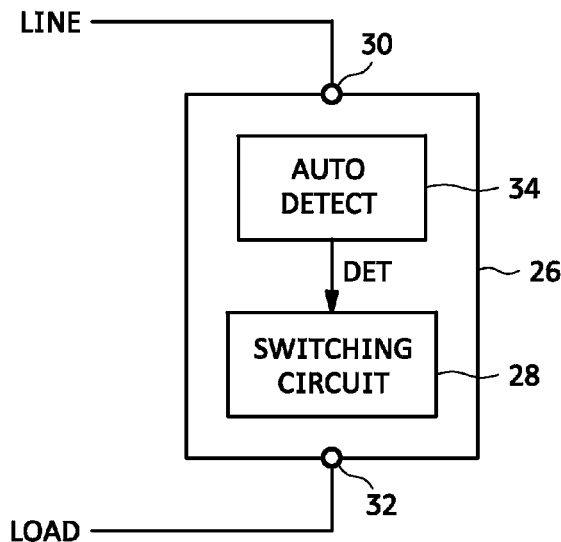
FIG. 9
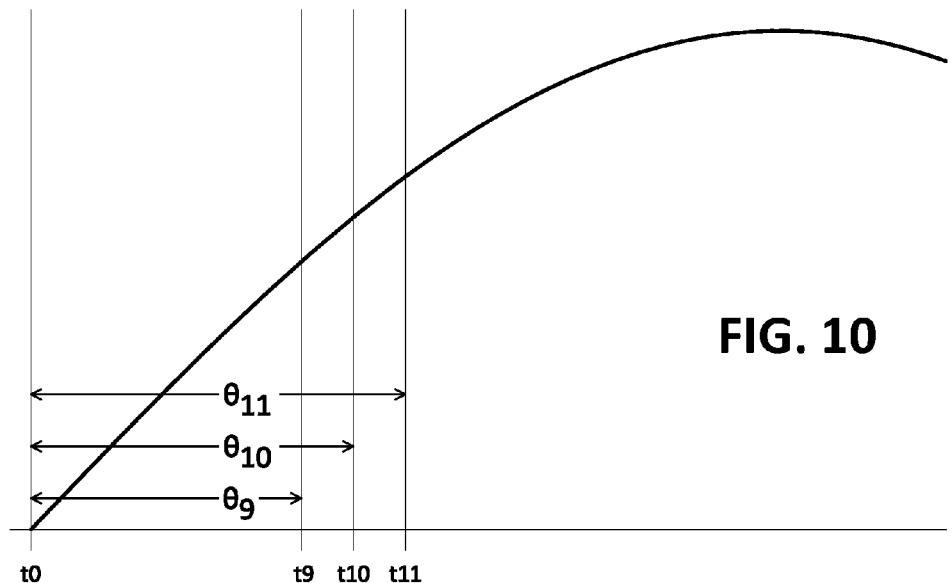
FIG. 10
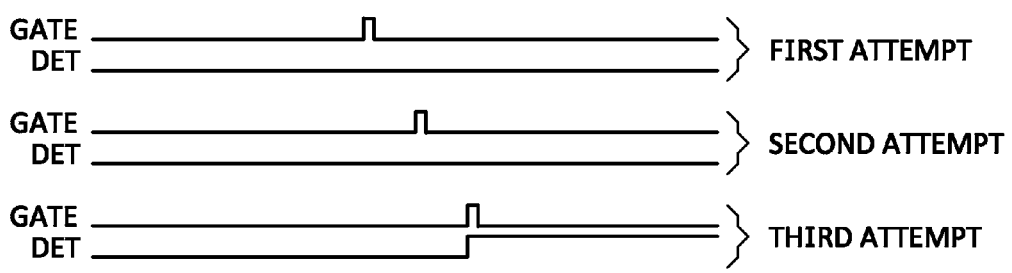

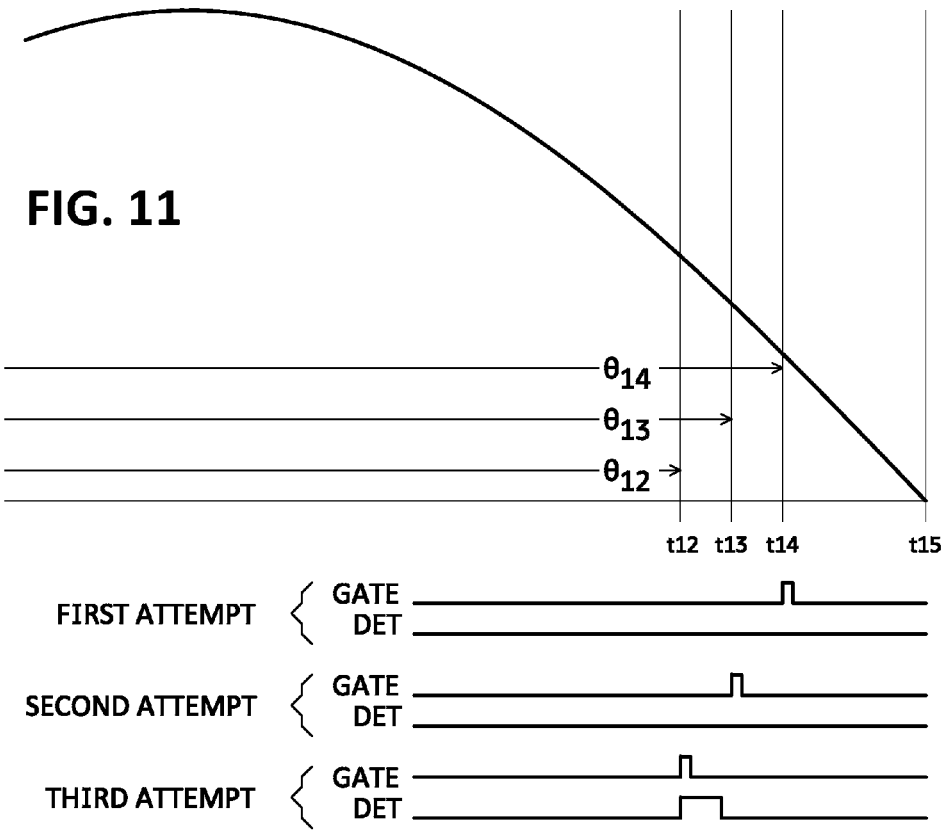
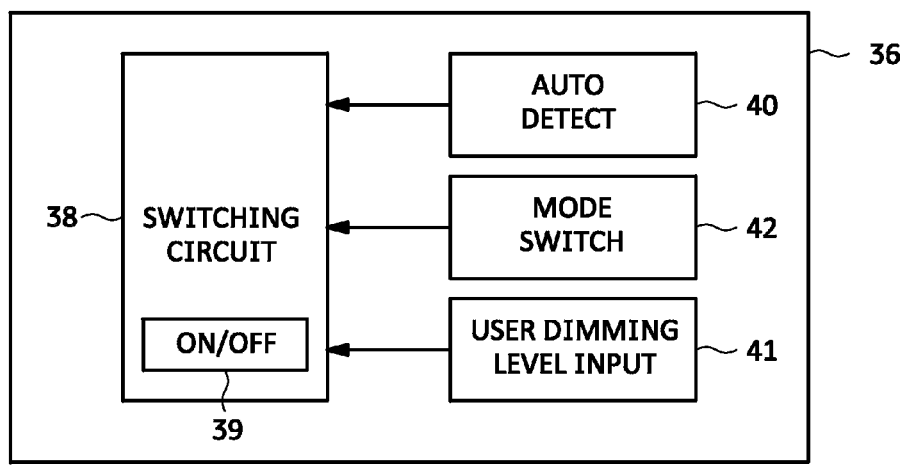

PHASE CONTROL WITH ADAPTIVE PARAMETERS

CROSS REFERENCE TO RELATED APPLICATION

This application is a continuation of U.S. patent application Ser. No. 12/650,420 filed on Dec. 30, 2009, which is incorporated herein in its entirety.

BACKGROUND

FIG. 1 illustrates a prior art circuit for controlling the flow of AC power to a load. An AC power switch, shown here as a Triac TR, is series connected between the power source 12 and the load 14. A controller 16 operates the Triac to regulate the RMS power transferred to the load using a phase control technique as shown in FIG. 2.

The voltage available from the AC power source is shown as a broken line in FIG. 2. Each line cycle of the AC power source has a positive half cycle beginning at a first zero crossing at time t0 and ending at a midpoint zero crossing at t2. The AC line cycle then has a negative half cycle beginning at t2 and ending at another zero crossing at t4. For common 60 Hz power, the entire line cycle from t0 to t4 lasts 1/60th of a second.

At the beginning of the line cycle illustrated in FIG. 2, the Triac remains off during a delay period $T_D$. At time t1, the Triac is turned on to connect the power source to the load. The portion of the AC voltage waveform actually applied to the load is shown as a solid line. The Triac continues conducting power to the load during conduction period $T_C$ until it switches off at the zero crossing at t2. Triacs are self-commutating devices, which means that they turn themselves off when the current through the device falls below a holding level as described below. The same process is repeated for the negative half cycle where the Triac turns on at t3 and off at t4. Generally, if the load is purely resistive, the current $I_L$ flowing through the load has essentially the same waveform as the portion of the AC voltage applied to the load as shown in FIG. 3.

By varying the conduction period $T_C$, the amount of power delivered to the load may be regulated. If the load is a lighting load, regulating the amount of power controls the brightness of the load. The waveforms shown in FIGS. 2 and 3 represent a relatively low power setting where a small percentage of the power available during each line cycle is delivered to the load. FIGS. 4 and 5 illustrate a relatively high power setting where the conduction period $T_C$ is longer. The greater the area of the solid waveform, the greater the percentage of available power delivered to the load The time periods illustrated in FIGS. 2-5 are often described in terms of angles where an entire AC line cycle is 360 degrees. Thus, the conduction period $T_C$ is commonly referred to as the conduction angle $\theta_C$, while the delay period $T_D$ is typically referred to as the firing angle $\theta_F$, or the delay angle or triggering angle. The illustrative firing angle in FIGS. 2 and 3 is about 120 degrees, while the illustrative firing angle in FIGS. 4 and 5 is about 60 degrees.

BRIEF DESCRIPTION OF THE DRAWINGS

FIG. 9 illustrates an embodiment of a power control system according to some inventive principles of this patent disclosure.

FIG. 10 illustrates an embodiment of a method for determining a maximum power level for a load according to some inventive principles of this patent disclosure.

FIG. 11 illustrates an embodiment of a method for determining a minimum power level for a load according to some inventive principles of this patent disclosure.

FIG. 12 illustrates an embodiment of a dimmer 36 according to some additional inventive principles of this patent disclosure.

DETAILED DESCRIPTION

Figure 1:
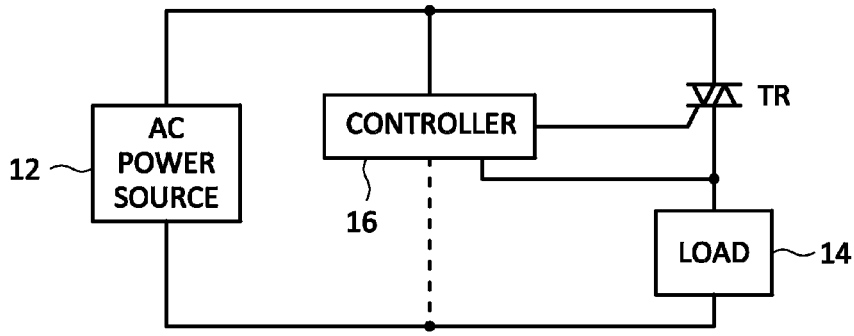
FIG. 1 is a block diagram of a prior art circuit for controlling the flow of AC power to a load.
Figure 2:
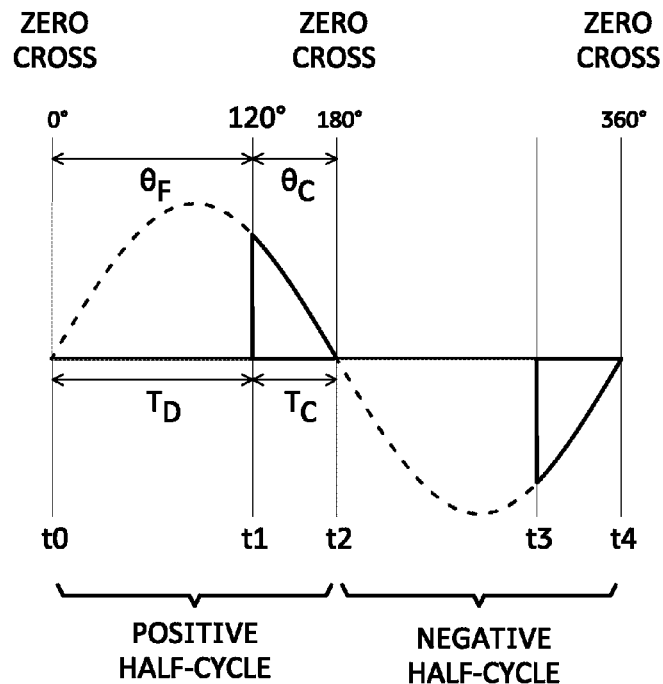
FIGS. 2-5 illustrate a prior art phase control technique for controlling the flow of AC power to a load.
Figure 6:
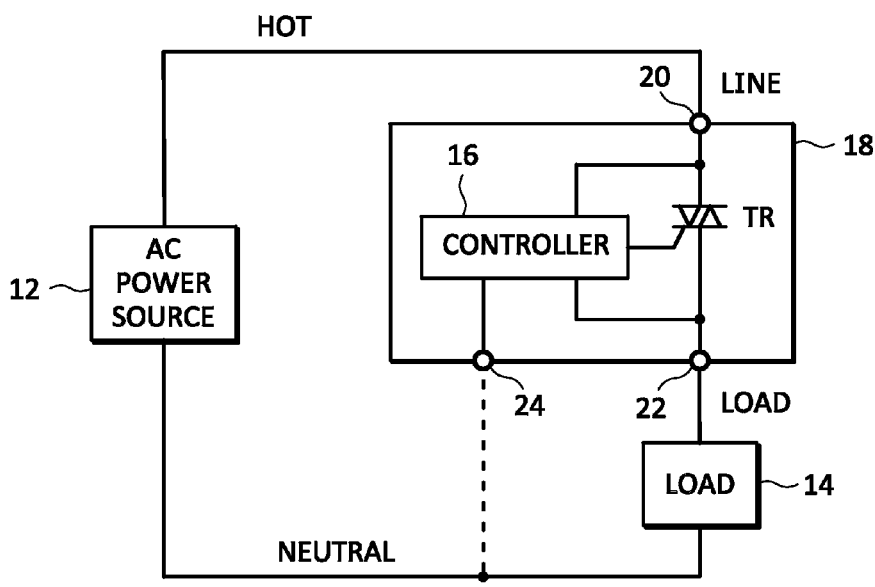
FIGS. 6-8 illustrate the construction and operation of a prior art phase control device.

In the circuit of FIG. 1, the controller 16 includes electronic circuitry that requires a power supply for operation. The controller and Triac or other phase-control switches are typically packaged in a common assembly 18 as shown in FIG. 6. The assembly must include a line terminal 20 and a load terminal 22 to be able to operate as a switch. If the assembly can include a connection to a neutral terminal 24, then the full AC power source is always available to generate a power supply for the controller. In many situations, however, a neutral connection is not available, so the power supply for the controller must be derived from the current path that flows through the load. This places constraints on the manner in which the power supply for the controller can be derived.

For example, the circuit of FIG. 6 may be used in a two wire phase control dimmer with no neutral connection for lighting applications. During time periods when the Triac is off, the full AC line voltage appears across the line and load terminals. This voltage may be used to generate the power supply for the controller, but in the case of a two wire dimmer, any current consumed by the power supply also flows through the load 14 and may interfere with the normal off state of the load. For example, a compact fluorescent lamp (CFL) typically includes an input rectifier and capacitor, as well as its own control electronics. Even a small power supply current flowing through the lamp in the off state may keep charging the input capacitor until it reaches a voltage level that causes the lamp to ignite briefly. This may possibly cause visible flicker and reduce the operating life of the lamp.

During time periods when the Triac is on, the line and load terminals of the dimmer are essentially shorted, so there may be insufficient voltage available to generate a power supply for the controller. Therefore, very little power is typically available for power supplies in two wire devices.

To accommodate the need for power supplies, two wire dimmers typically have a minimum lamp wattage that they are specified to work with. These minimums may be adequate when used with incandescent lamps. For example, a dimmer having a specified 60 watt minimum load may require a certain number of milliamps of leakage current for a power supply. A 60 watt incandescent lamp may be able tolerate this level of leakage current. A 60 watt equivalent CFL, however, may only be rated for 13 watts. Moreover, the capacitive input structure and electronic controls of a CFL may cause them to be vulnerable to malfunctions due to leakage current, or the CFL may not enable the dimmer to conduct the amount of current it needs to operate the power supply for its control electronics.

Much of the power used by a controller in a phase control device is devoted to controlling the power switch. Some switches, such as transistors and relays, must receive a constant gate signal during the entire conduction period. Other switches, such as Triacs and silicon controlled rectifiers (SCRs), have regenerative switching properties that cause them to latch in the conductive state in response to short gate pulses if the load current exceeds a latching level. Once in the conductive state, the switch remains conductive until the current through the switch drops below a holding level, at which point it automatically switches off. This typically occurs when the load current drops below the holding level at or near a zero crossing. Therefore, use of latching switches which can be triggered by short pulses can reduce the amount of power required by a controller.

Figure 7:
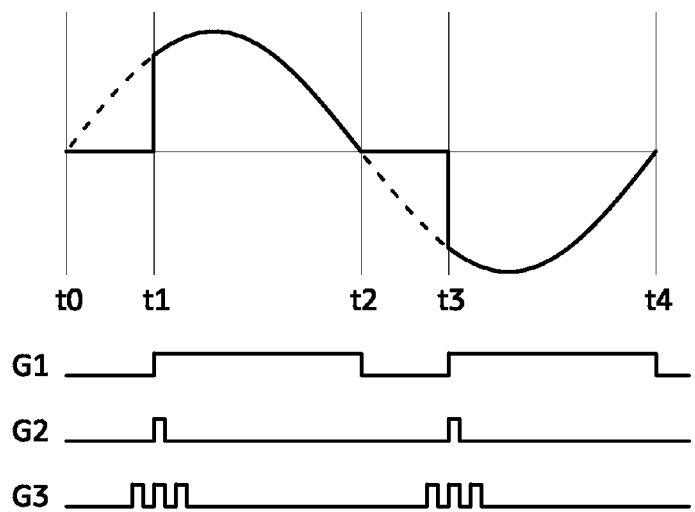

This may be understood with reference to FIG. 7 which illustrates various gating pulses over an AC line cycle. Signal G1 illustrates a gate pulse that may be used for a transistor or other switch requiring a continuous gate pulse during the entire conduction period from t1 through t2. Thus, the gating operation consumes power during the entire conduction period. This technique can be, and in some instances is, used to maintain a latching switch such as a Triac or SCR in a conducting state when there is otherwise not enough current to do so inherently.

Signal G2 illustrates a short gate pulse that may be used to trigger a Triac or SCR at time t1, which, under appropriate conditions, latches on for the remainder of the half cycle. In this case, the gating operation only consumes power during a small fraction of the conduction period, thereby reducing the overall power consumption.

Figure 3:
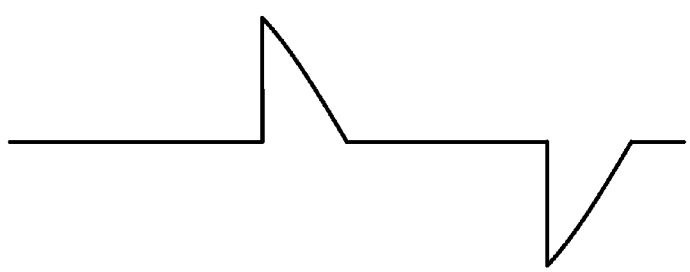
Figure 4:
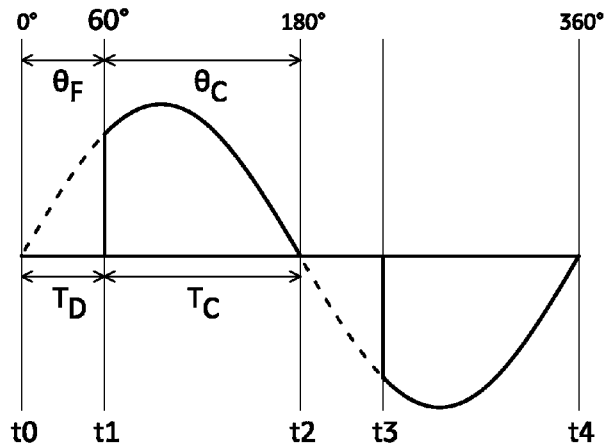
Figure 5:
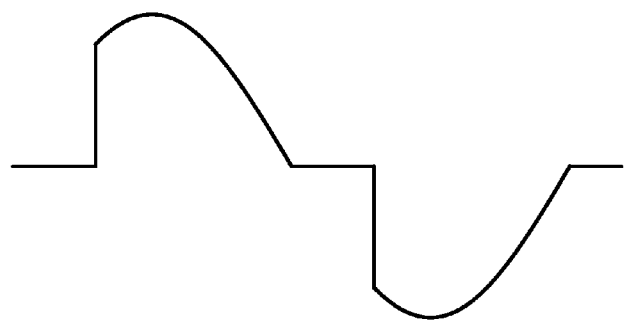
Figure 8:
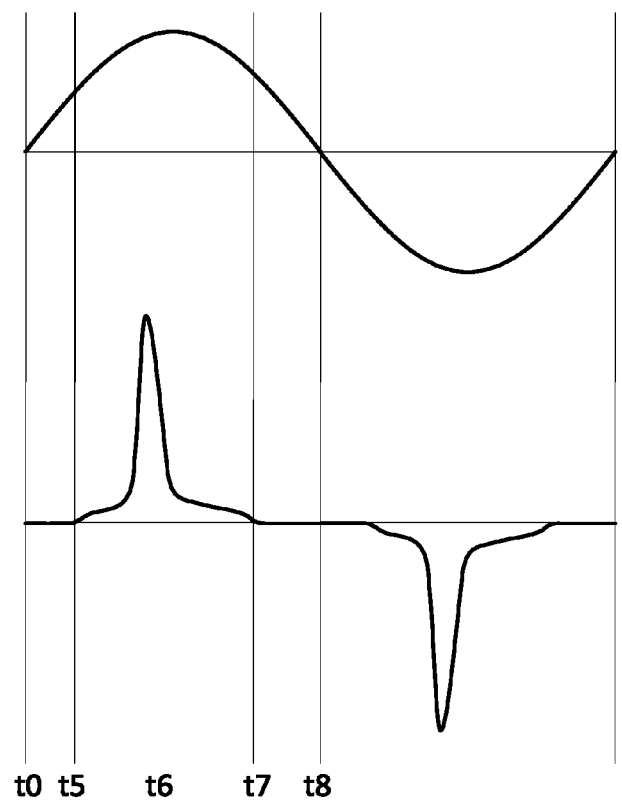

Although the gating technique of signal G2 may work adequately with a purely resistive load, it presents a different set of challenges when used with loads having a capacitive input or other nonlinear characteristics. For example, the input current of a CFL bulb typically does not follow the waveform of the input voltage. Instead, the input current tends to flow in the form of short duration, high magnitude pulses as shown in FIG. 8, which illustrates the voltage and current waveforms for an exemplary CFL over one positive half cycle of an AC power source. In FIG. 8, the CFL is presumed to be connected directly to the AC power source so that the full AC voltage waveform is applied to the CFL. The voltage begins rising at time t0, but the CFL does not draw any current until time t5. The current then climbs rapidly until reaching a peak at t6. The current then falls rapidly until reaching essentially zero at t7, which is before the end of the half cycle at t8. This is in contrast to a resistive load in which the current follows the voltage waveform as illustrated in FIGS. 3 and 5.

Referring again to FIG. 8, if a short gate pulse is applied to the Triac during the time period between t0 and t5, the CFL may fail to turn on and/or remain on. That is, since the gate pulse is applied at a time when the CFL draws no current, the switching device, e.g., the Triac, may not turn on at all, and the entire half cycle of conduction may be missed. Alternatively, if the gate pulse is applied at a time when the CFL may draw some current, but not enough to latch the Triac in the conductive state, the CFL may receive power only during the duration of the gate pulse, and the result may be a short flash of light from the CFL, i.e., flickering. Thus, the firing angle corresponding to time t5 could represent the limit for maximum brightness, i.e., the maximum possible conduction time.

Likewise, there is typically a firing angle corresponding to a minimum brightness close to the end of the half cycle. If the Triac is gated too late, it may fail to conduct any power to the CFL or it may only conduct during the gate pulse period if the CFL does not draw enough current to latch the Triac or hold the Triac in the conductive state. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the Triac.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, etc.

One way to assure that the Triac will be triggered when operating near the point of maximum brightness is to continue gating the Triac during the entire conduction period. Then, even if the gate pulse begins before t5, the continuous gating assures that the Triac will eventually begin conducting when the CFL begins drawing current at time t5. This may, however, consume more power than the power supply can provide.

Another technique for accommodating uncertainty in the firing angle at maximum brightness involves the use of multiple gate pulses as shown with signal G3 in FIG. 7. By using enough pulses over an appropriate length of time it may assure that one of the pulses will trigger the Triac at a time when the CFL will draw enough current to latch. The use of multiple gate pulses, however, may create harmful electromagnetic and/or acoustic noise. It may also consume more power than using a single gate pulse per half cycle.

Another technique for assuring that the Triac will be triggered when operating near the points of maximum and minimum brightness is to limit the firing angle to a range that is well within the limits expected for a wide range of lamps over any anticipated operating conditions. This, however, requires sufficiently large time buffers be included at the high and low ends of operation that can reduce the available dimming range for some loads.

FIG. 9 illustrates an embodiment of a power control system 26 according to some inventive principles of this patent disclosure. The embodiment of FIG. 9 includes a switching circuit 28 to control the flow of power from a line connection 30 to a load connection 32, and functionality 34 to automatically detect one or more parameters for use by the switching circuit 28. Examples of parameters that may be detected include maximum and/or minimum power, current, and/or voltage levels, the conductive state of one or more switches in the switching circuit, the type of load or loads connected to the system, the number of loads connected to the system, the malfunctioning of one or more loads connected to the system, etc.

The switching circuit 28 may include any type of power switch including thyristors such as Triacs, SCRs, gate turn-off (GTO) thyristors, etc., transistors such as bipolar junction transistors (BJTs), field effect transistors (FETs), etc., and relays such as electromechanical relays, solid state relays, etc. The switching circuit 28 may further include support circuitry such as measurement and control circuitry, switch drivers, power supplies, communication circuitry, isolation circuitry, etc. The support circuitry may also include functionality to implement phase control or other power control techniques.

The automatic detection functionality 34 may be implemented with analog and/or digital hardware, software, firmware or any combination thereof. The automatic detection functionality may be separate from the switching circuit, integral with the switching circuit, or realized in a hybrid arrangement.

In some embodiments, the inventive principles may be used to determine one or more limit points on a waveform of an AC power supply when a phase control switch is used to control the flow of power from the AC power supply to a load. The limit points may be points which provide a maximum or minimum power flow as described in the example embodiments of FIGS. 10 and 11 which may be used, for example, in a wiring device, a cabinet or rack-mounted dimmer, or other field installable control apparatus.

FIG. 10 illustrates an embodiment of a method for determining a maximum power level for a load according to some inventive principles of this patent disclosure. The embodiment of FIG. 10 is described in the context of a Triac that is controlling a single phase AC power source to provide dimming control of a CFL lamp, but the inventive principles are also applicable to other loads and other phase control systems with one or more latching switches that may be triggered by the application of a pulsed stimulus. Suitable examples include thyristors such as Triacs and SCRs, and other regenerative type switches.

FIG. 10 illustrates a first portion of a positive AC half cycle beginning at a zero crossing at time t0. In one embodiment, during a first attempt to determine a maximum brightness level, a gate pulse is applied to the Triac at a test point at time t9 (firing angle $\theta_9$). The initial firing angle may be provided by a lookup table, calculation, user input, or any other suitable source. A detection signal DET provides an indication of the conductive state of the Triac. The detection signal may be provided by any suitable apparatus such as a current sensor, voltage sensor, zero cross circuit, etc. The detection signal is monitored to determine if the Triac has latched in a conductive state after the gate pulse is removed. If, as illustrated in the first attempt of FIG. 10, the detection signal does not indicate a latching condition during a predetermined monitoring period $T_{M1}$, for example ~1.5 ms, the initial firing angle is presumed to have been too low. The detection signal may be sampled one or more times during the monitoring period. As a result, the firing angle is increased by a certain predetermined amount, and a second attempt is made during the next positive half cycle. During the second attempt, the gate pulse is applied at a second test point at time t10 (firing angle $\theta_{10}$), and the detection signal is monitored during time $T_{M2}$. If, as depicted, the detection signal does not indicate a latching condition, the second firing angle is again presumed to have been too low. The firing angle is increased by a predetermined amount again and a third attempt is made during the next positive half cycle. During the third attempt, the gate pulse is applied at a third test point at time t11 (firing angle $\theta_{11}$), and the detection signal is monitored during time $T_{M3}$. As depicted in this illustrative example, the detector signal DET indicates that the Triac is in a conductive state, and further, since the Triac remains in a conductive state even after the gate pulse is removed, the Triac is presumed to have latched.

Depending on the size of the increment in the firing angle, the process may be adapted to decrease the angle to a value between the current angle and previous angle to find, or zero-in on, the firing angle for the maximum brightness level.

The firing angle $\theta_{11}$ may be used as a maximum brightness setting for subsequent operation. In one embodiment, the maximum brightness setting may be determined once, e.g., at power-up. Alternatively, the maximum brightness determination may be performed continuously, periodically, and/or occasionally in response to changed conditions such as changed load, line voltage, user input, etc. As another alternative, the dimmer may operate using preprogrammed minimum and/or maximum brightness levels, then perform the one or more brightness limit determinations after the load has warmed up.

In the embodiment of FIG. 10, the maximum brightness point is approached from a starting point that is too high. Alternatively, the algorithm may start from a point that is too low and approach the maximum brightness point from the other direction. In such an embodiment, the firing angle would be reduced by a predetermined incremental amount at each attempt until the Triac fails to latch. Then the previous firing angle may be used as the maximum.

Referring back to the first attempt, if the Triac was determined to have latched at firing angle $\theta_9$, then the maximum brightness may be presumed to be at, or close to, $\theta_9$. Alternatively, subsequent attempts/iterations may be made to decrease the firing angle to determine if a brighter maximum operating point is available. In some embodiments, the algorithm may operate in both directions to determine the point of maximum brightness once, periodically or occasionally.

When increasing or decreasing the firing angle on subsequent attempts, the firing angle may be increased or decreased in fixed increments, variable increments, or any other suitable increments. In the embodiment of FIG. 10, the attempts to determine the maximum brightness are conducted during positive half cycles of the AC power source. In other embodiments, the determination may be made during negative half cycles, both positive and negative half cycles, or any other suitable arrangement.

FIG. 11 illustrates an embodiment of a method for determining a minimum power level for a load according to some inventive principles of this patent disclosure. The embodiment of FIG. 11 operates in essentially the reverse manner of the embodiment of FIG. 10, and the numerous variations described above with respect to FIG. 10 apply as well to the embodiment of FIG. 11.

FIG. 11 illustrates a last portion of a positive AC half cycle ending at a zero cross at time t15. During a first attempt to determine a minimum brightness level, a gate pulse is applied to the Triac at a first test point at time t14

(firing angle $\theta_{14}$). The detection signal does not indicate a latching condition during a monitoring period $T_{M4}$, so the initial firing angle is presumed to have been too high. Therefore, the firing angle is decreased and a second attempt is made during the next positive half cycle. During the second attempt, the gate pulse is applied at a second test point at time t13 (firing angle $\theta_{13}$), and the detection signal does not indicate a latching condition during time $T_{M5}$, so the firing angle is decreased again. During the third attempt, the gate pulse is applied at a third test point at time T12 (firing angle $\theta_{12}$), and the detection signal DET indicates that the Triac has latched in a conductive state. Therefore, firing angle $\theta_{12}$ is determined to be the point of minimum brightness.

The inventive principles described above may provide various individual and/or collective benefits. For example, by determining settings for maximum and/or minimum brightness using the actual apparatus and/or under real operating conditions, the inventive principles may eliminate uncertainty caused by manufacturing tolerances, variations in load designs, line voltage, ambient temperature, etc. This may extend the dimmable range available to the user.

Moreover, in embodiments that perform a limit determination more than once, the inventive principles may enable the system to adapt to changing conditions. For example, the minimum brightness for a CFL bulb may be higher when it is cold than when it warms up. The inventive principles may enable a dimmer to adjust the minimum brightness level as the lamp warms up, thereby maximizing the dimmable range at some or all times. Similar accommodations may be made for operating limits that may change as the lamp ages.

Some of the inventive principles may enable the implementation of unobtrusive limit determinations. For example, a minimum brightness level may be determined by starting at a nominal minimum brightness level and adjusting the minimum level adaptively as described above for a period of time (e.g., ~0.5-1.0 seconds) after turning a lamp on, or at any other suitable time. In such an embodiment, the minimum level determination may be invisible because the current drawn by the lamp may be enough to latch the Triac but not enough to cause the lamp to light.

In some embodiments, a dimmer may include a kick start feature that temporarily operates a lamp at or near the maximum power setting immediately after turning on to warm it up and make it easier to sustain the gas discharge at lower brightness levels. After the kick start period, which may range, for example, from a few hundred milliseconds to a few seconds, the dimmer may jump or fade to a lower, user specified setting. The user specified setting, however, may be lower than the actual minimum brightness at that time. By implementing a continuous adaptive algorithm to determine the minimum brightness as described above, the dimmer may maintain the lamp at the current lowest dimmable setting, thereby preventing flicker or shut off conditions. As the lamp continues to warm up, the adaptive algorithm may continue to adjust the minimum brightness setting downward until the user specified setting is reached.

In some embodiments, a minimum brightness level may be determined automatically by monitoring the conductive state of a switch while operating at higher brightness levels without performing an adaptive adjustment algorithm. For example, if a lamp is operating at a high brightness level as shown in FIG. 8, the dimmer may monitor the detector signal to determine when the load current falls below the holding current of the switch. Under the operating conditions shown in FIG. 8, this occurs at time t7. The dimmer may capture the timing of this event and use it as a minimum brightness level.

This technique may be useful to prevent flicker which may otherwise occur when determining a minimum brightness level using an adaptive technique. For example, a dimmer may initially operate a lamp at a relatively high brightness level, e.g., because of a kick start or because the user has selected a relatively high brightness level. When dimming down from the high brightness level, it may be possible to see a short blink if the firing angle reaches a point where the load current falls below the switch holding current before the adaptive algorithm finds the correct minimum brightness level. By using the minimum brightness level based on the captured turn-off time, the blink maybe avoided, and a minimum brightness level may be obtained with the adaptive level determination. Alternatively, the captured time may be used as an initial starting point for an adaptive determination of the minimum brightness level.

Some additional inventive principles of this patent disclosure relate to techniques for integrating adaptive brightness limit determinations with a user interface. Some prior art dimmers enable a user to manually adjust a minimum brightness level. This may be accomplished with a special adjustment potentiometer that is connected in series with a main potentiometer that is used to set the dimming level. It may also be accomplished by having a microcontroller or other circuit in the dimmer read the adjustment potentiometer directly. The minimum brightness level adjustment can be initiated by switching the dimmer to a special programming mode, by pressing and holding a button that normally has a different function, or by using a special mode switch.

FIG. 12 illustrates an embodiment of a dimmer 36 according to some additional inventive principles of this patent disclosure. The dimmer includes a switching circuit 38 to provide phase control of power to a load, auto detect functionality 40 to provide any of the automatic limit detection functionality described in this patent disclosure, mode switching functionality 42, and a user input 41 to enable a user to set a dimming level. The switching circuit 38 may include any suitable phase control technology including thyristors, transistors, etc. A master on/off switch 39 such as mechanical switch or air gap relay may be included to completely disconnect the dimmer from the source of power.

The mode switching functionality 42 may be implemented with a dedicated mode switch located anywhere on or in a housing, behind a face plate, under a paddle switch, etc. Alternatively, the mode switching functionality may be implemented by pressing, holding, or turning a button or other control in some manner that would not be used during normal operation, e.g., pressing and holding a rocker paddle switch for an extended length of time. The mode switching functionality may also be implemented with wireless technology, a network interface, or any other suitable technique. The user input may be implemented with a potentiometer, encoder, up/down buttons, etc.

Upon entering adjustment mode using any suitable mode switching technique, e.g., moving a dedicated mode switch to a predetermined position, the system of FIG. 12 may extend the dimming range to the extreme lower limit possible with the switching circuit. The system may also enable adaptive minimum brightness level functionality as described above. The user may then operate the dimming level input to adjust the dimming level to the desired level. If the adaptive minimum brightness level functionality is enabled, it may prevent the user from adjusting the minimum brightness level lower than the limit determined by the adaptive algorithm. Once the user sets the minimum dimming level, the mode switch or other mode switching technique may be used to exit minimum adjustment mode and return to normal operating mode. Upon leaving minimum adjustment mode, the new minimum dimming level may be used to readjust the dimming range and then stored in a non volatile form for further use, e.g., nonvolatile memory, static memory, etc.

If the adaptive minimum brightness level functionality is not enabled during the minimum level adjustment procedure, the user may select a minimum brightness setting that is lower than the level that would be determined by the adaptive algorithm. However, during normal operating mode, the adaptive algorithm may be enabled to prevent the dimming level from falling below the adaptively determined minimum level.

The inventive principles described above may also be applied to the other end of the dimming range to assist a user in setting a maximum brightness level. For example, an adaptive algorithm for determining the maximum brightness limit may be enabled while the dimmer is place in a maximum adjustment mode. In this mode, the system may extend the dimming range to the extreme upper limit possible with the switching circuit. Then with the adaptive maximum brightness level functionality enabled or disabled, the user may set the dimming level to the maximum desired level, which is then used to readjust the dimming range and stored in a nonvolatile form upon exit from the maximum adjustment mode.

Adaptive limit determinations may also be integrated into other functions of a dimmer according to some additional inventive principles of this patent disclosure. For example, the setting of a mode switch, or other mode switching functionality, may be interpreted differently depending on when the state of the switch is checked. For purposes of illustration, some examples will be described in the context of a system having a dedicated two-position mode switch, but the inventive principles apply to systems using any other mode switching functionality.

If the state of the mode switch is checked during normal operation when the dimmer is on, changing the state of the mode switch may place the dimmer in a maximum and/or minimum dimming level adjustment mode. However, if the state of the mode switch is checked at power up, such as when the mechanical switch 39 is turned on, or when power is applied to the dimmer from an external source, the mode switch may be used to configure the dimmer for use with different types of loads.

For example, in a first embodiment, the dimmer may be configured for use with a CFL if the mode switch is in a first position at power up, or it may be configured for use with an incandescent lamp if the mode switch is in a second position at power up. Alternatively, the mode switch can have more than two states and/or conditions for selecting the mode, e.g., a mixed mode including both incandescent and CFL lamps on the same circuit so that the algorithm adapts accordingly.

In a second embodiment, the dimmer may be configured for CFL operation if the mode switch is in the first position at power up, or it may be configured for auto-configure mode if the mode switch is in the second position at power up. In auto-configure mode, the system may determine the type of load it is connected to by firing a thyristor at a very high firing angle (low conduction angle) and observing the results. The firing angle may be set to a level (e.g., 1.5 ms before a zero cross) that would typically not cause a thyristor to latch if the load is a CFL, but would cause the thyristor to latch with an incandescent load. Thus, if the thyristor latches, the system presumes the load is an incandescent or other resistive load, and configures itself accordingly as described below. However, if the thyristor fails to latch, the system may presume the load is a CFL or other type of capacitive or nonlinear input and configure itself accordingly as described below. Alternatively, the CFL/incandescent determination may be accomplished turning on any other type of switch such as a transistor shortly before a zero cross and observing the amount of load current.

In a third embodiment, the dimmer may be configured for incandescent operation if the mode switch is in the first position at power up, or auto-configure mode if the mode switch is in the second position at power up.

In any of these embodiments, after the mode switch is read at power up and the system is configured for the type of load, the mode switch may subsequently be used to place the dimmer in a maximum and/or minimum dimming level adjustment mode, and then back to normal operating mode after the new minimum or maximum level adjustment is completed.

In any of the above embodiments, if the dimmer is configured for operation with a CFL, it may implement a further start up procedure as follows after returning to normal mode. First, a minimum dimming level may be determined. If a minimum dimming level is already stored in memory, it may be retrieved and used as the minimum. If no minimum level is stored, an adaptive algorithm or other technique may be used to determine a minimum dimming level as described throughout this patent disclosure. Alternatively, a generic minimum dimming level for a CFL may be used, a look-up table may be used, or any other suitable technique may be used to determine a minimum dimming level. As another alternative, the dimmer may force a user to set a minimum diming level manually, with or without the assistance of an adaptive minimum level determination.

A manual or automatic maximum dimming level may also be determined, either before or after the minimum dimming level is established. The maximum dimming level may be determined completely through an adaptive algorithm, manually with the assistance of an adaptive algorithm, or completely manually.

After a minimum and/or maximum dimming level is determined, the dimmer may jump to a kick start level, then fade to a user set level. An adaptive maximum and/or minimum level determination may be enabled or disabled in this mode.

In any of the above embodiments, if the dimmer is configured for operation with an incandescent lamp, it may skip the kick start and operate as an ordinary incandescent dimmer.

Figure 13:
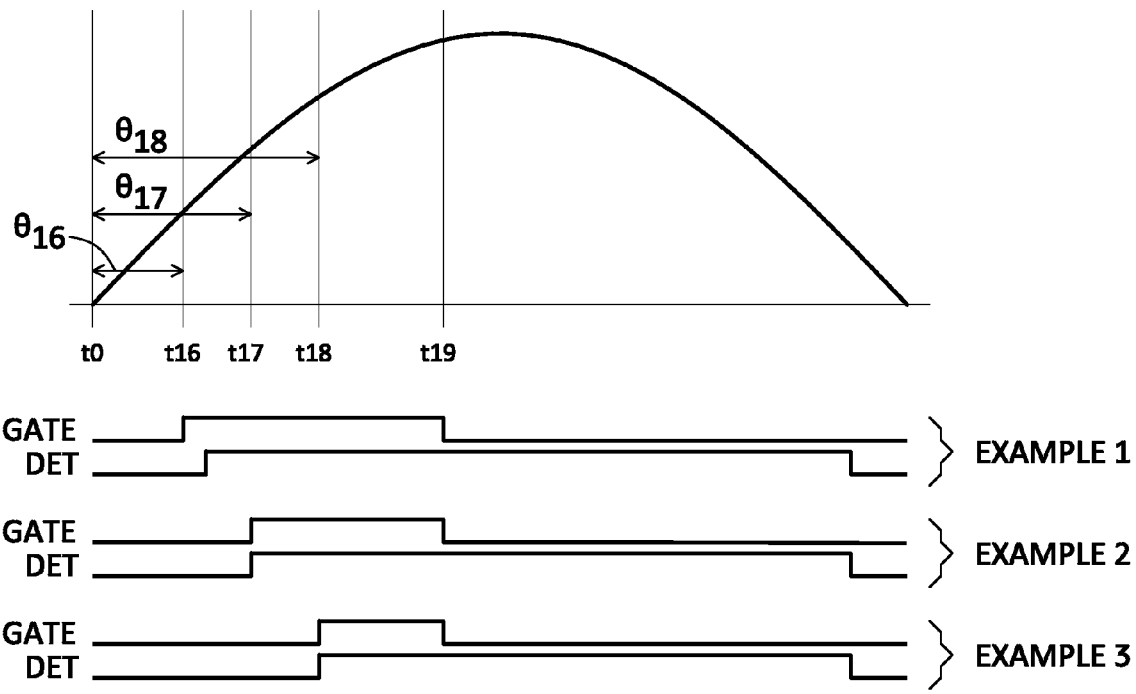
FIG. 13 illustrates an embodiment of a phase control technique using variable pulse widths according to some inventive principles of this patent disclosure.

Some additional inventive principles of this patent disclosure relate to the use of variable pulse widths to gate a power switch. FIG. 13 illustrates an embodiment of a phase control technique using variable pulse widths according to some inventive principles of this patent disclosure. Example 1 illustrates waveforms for a power level near the maximum end of the dimming range. A Triac or other latching switch is gated by the signal GATE beginning at time t16 (firing angle θ16) and continuing until time t19 which is around the middle of the positive half cycle. A detector signal DET shows that the Triac begins conducting shortly after being gated. If the Triac had been gated with a short gate pulse, it may have failed to latch, and the entire half line cycle of conduction may have been missed. Gating the Triac continuously until about the middle of the half cycle assures that the Triac will latch and hold if possible because the peak conduction current typically occurs around the middle of the half cycle. However, discontinuing the gate pulse during the remainder of the half cycle may substantially reduce the amount of power consumed by the gating circuit.

Example 2 illustrates waveforms for a power level somewhat below Example 1. The Triac is gated beginning at time t17 (firing angle θ17) and continuing until time t19. Here, the signal DET shows that the Triac begins conducting immediately upon being gated. Example 3 illustrates waveforms for a power level somewhat below Example 2. As the firing angle approaches the midpoint of the half cycle, the variable width of the gate pulse becomes progressively smaller, thereby reducing the amount of power required to gate the Triac.

As the firing angle approaches and then moves past the midpoint, the Triac or other latching switch may be gated with a short gate pulse. As the firing angle approaches the low end of the dimming range, an adaptive algorithm as described above may be used to determine the minimum dimming level.

The detector signal DET may not be necessary for practicing the variable pulse width technique in the first portion of each half cycle, but it may be convenient for illustrating the operation using some concepts introduced above, and it may also be useful for implementation of an adaptive algorithm for automatically determining the lower limit of the dimming range.

Figure 14:
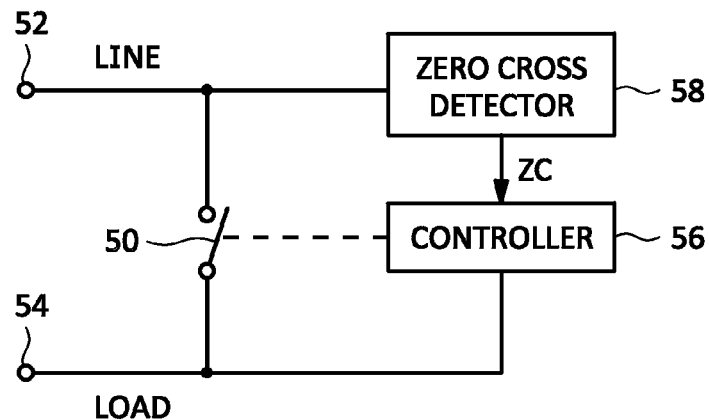
FIGS. 14-18 illustrate the construction and operation of an embodiment of a power control system according to some inventive principles of this patent disclosure.

Some additional inventive principles of this patent disclosure relate to techniques for detecting the conductive state of a switch. FIG. 14 illustrates an embodiment of a power control system according to some inventive principles of this patent disclosure. The embodiment of FIG. 14 includes a switch 50 that provides phase control of power flowing between a line terminal 52 and a load terminal 54 in response to controller 56. A zero cross detector 58 provides zero cross signal ZC to the controller 56 to synchronize the operation of the switch 50 with the AC line voltage. In the embodiment of FIG. 16, the controller uses variations in the zero cross signal ZC to determine the conductive state of the switch. This may be understood with reference to FIGS. 15-18.

Figure 15:
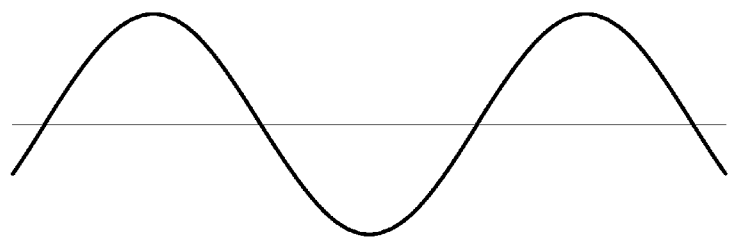
Figure 16:
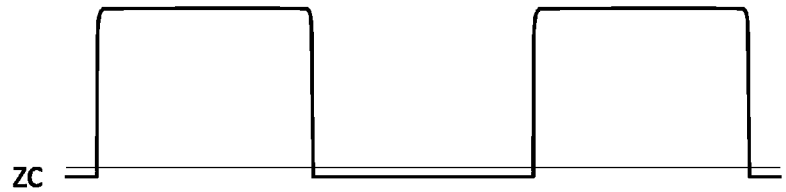

FIG. 15 illustrates the zero cross signal when the switch 50 is constantly open and no power is applied to the load. The zero cross signal ZC is high during positive half cycles of the AC line voltage and low during negative half cycles.

FIG. 16 illustrates the zero cross signal at a maximum output level with a nonlinear load such as a CFL bulb having a capacitive input. The zero cross signal ZC goes high at the zero cross at time t20. The switch is gated by a pulse in a gate signal GATE at time t21. This causes the switch to latch in a conductive state, thereby causing ZC to drop to a lower level as long as the switch is latched. At t22, the load current drops below the holding current of the switch which causes the switch to turn off and ZC to rise back to a high level.

Figure 17:
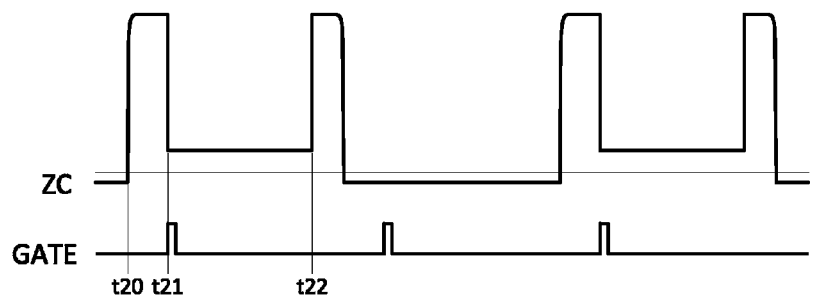

FIG. 17 is similar to FIG. 16 but illustrates the zero cross signal under a mid-range load condition. Here, the switch latches when it is gated at t23 and remains conductive until t24.

Figure 18:

FIG. 18 illustrates the zero cross signal at a firing angle that is just below the minimum output level. The switch is gated at t25, but there is not enough current to latch the switch, so the switch stops conducting when the gate pulse ends.

A potential benefit of a conduction detector based on a zero cross circuit is that it may utilize apparatus that already existed for synchronization purposes, thereby eliminating any need for additional circuitry.

Figure 19:
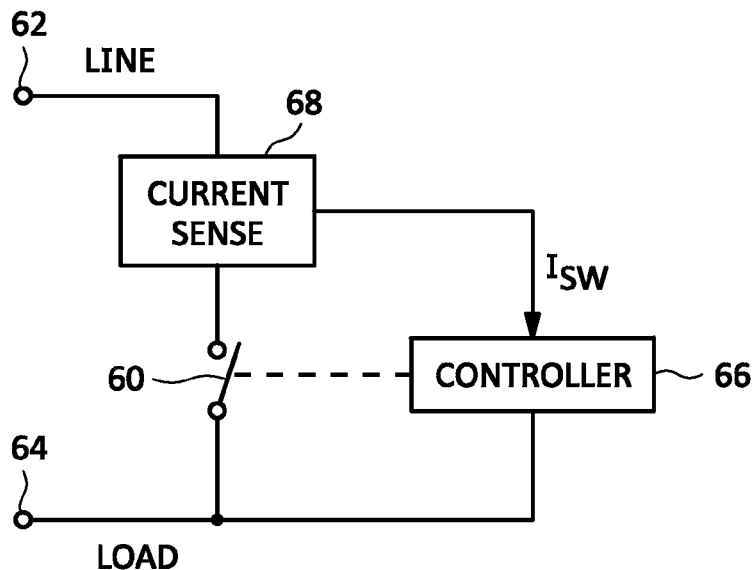
FIG. 19 illustrates another embodiment of a power control system according to some inventive principles of this patent disclosure.

FIG. 19 illustrates another embodiment of a power control system according to some inventive principles of this patent disclosure. The embodiment of FIG. 19 includes a switch 60 that provides phase control of power flowing between a line terminal 62 and a load terminal 64 in response to controller 66. A current sensor 68 measures the current flowing through the switch 60 and generates a signal $I_{SW}$ that enables the controller to determine the conductive state of the switch. The current sensor may include a series sense resistor, Hall effect detector, current transformer, or any other suitable current sensing device.

Although the zero cross detectors and current sensors described above are shown separate from the controllers for purposes of illustration, they may be integral with the controllers.

Some additional inventive principles of this patent disclosure relate to techniques for providing a power supply to a two wire dimmer. As explained above, the amount of power available to operate any control circuitry in a two wire dimmer is limited by the requirement that the voltage across the two terminals of the device must necessarily be almost zero during the conductive portion of each line cycle. Moreover, when used with a load such as a CFL, the amount of power that can be derived from the line voltage across the two terminals during the nonconductive portion of the line cycle, or when the load is off, is limited by the amount of leakage current the CFL can tolerate without causing a flash or other malfunction of the CFL.

Figure 20:
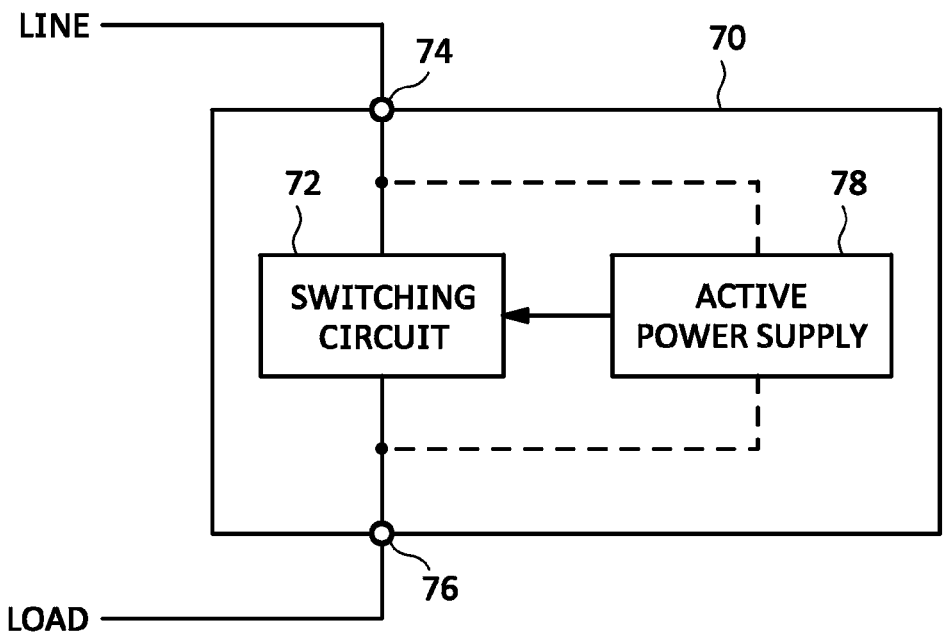
FIG. 20 illustrates an embodiment of a two wire dimmer according to some inventive principles of this patent disclosure.

FIG. 20 illustrates an embodiment of a two wire dimmer according to some inventive principles of this patent disclosure. The dimmer 70 includes a switching circuit 72 that provides phase control of power flowing between a line terminal 74 and a load terminal 76. Power to operate the switching circuit is provided by an active power supply 78 that derives its power from the load and line terminals 74 and 76 at opportune times and in a manner that may have low quiescent current and draw about only as much power as may be needed to operate the switching circuit. For example, the active power supply may provide very little power when the dimmer is off and/or during non-conducting portions of line cycles, and more power when the dimmer is on. The amount of power drawn and supplied by the active power supply may vary based on the current dimming level. For example, the active power supply may draw more power when the dimmer is operating near the high end of the dimming range where more power may be needed to gate a Triac or other switch, but it may draw less power at the lower end of the dimming range where less power may be needed for gate drive.

Figure 21:
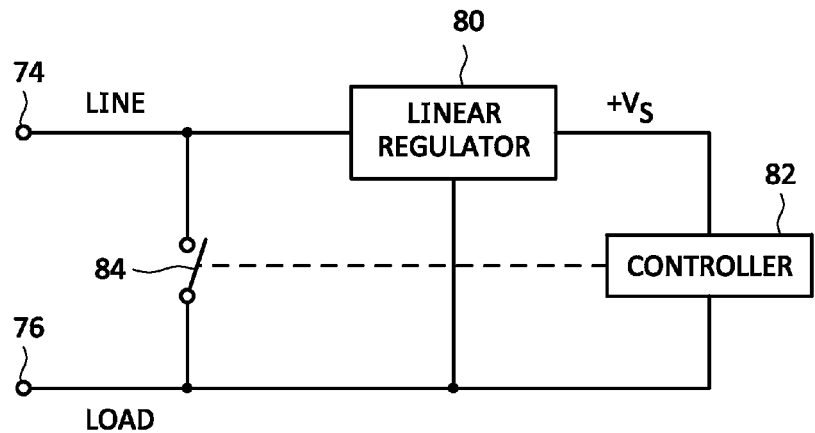
FIG. 21 illustrates an example embodiment of a two wire dimmer according to some inventive principles of this patent disclosure.

FIG. 21 illustrates an example embodiment of a two wire dimmer in which an active power supply is implemented with a linear regulator 80 which provides a power supply $+V_S$ for controller 82 to operate a phase control switch 84 according to some inventive principles of this patent disclosure. The linear regulator 80 may include a high-voltage commercial regulator that is capable of rectifying and dropping the entire line voltage down to a level usable by the controller 82. It may include a resistive divider, step down transformer, semiconductor voltage regulator, and/or any other suitable circuitry.

Figure 22:
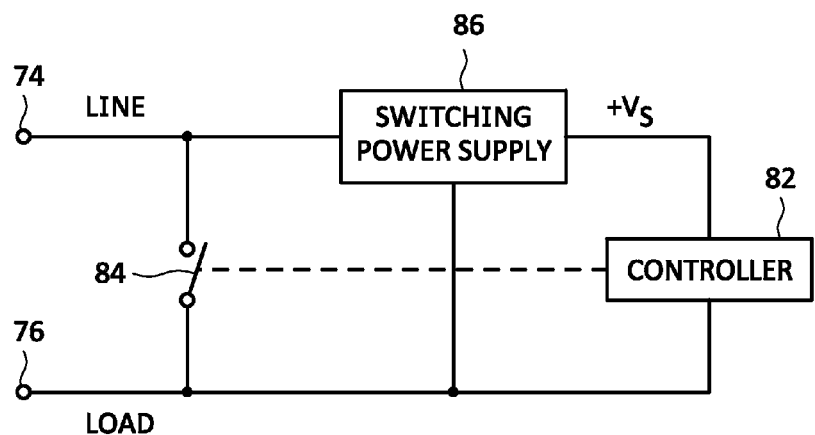
FIG. 22 illustrates another example embodiment of a two wire dimmer according to some inventive principles of this patent disclosure.

FIG. 22 illustrates another example embodiment of a two wire dimmer in which an active power supply is implemented with a switch mode power supply (SMPS) 86 which provides a power supply $+V_S$ for controller 82 to operate a phase control switch 84 according to some inventive principles of this patent disclosure. The switching power supply 86 may be based on any suitable topology such as a buck converter, push-pull converter, etc., with or without an isolation transformer.

Figure 23:
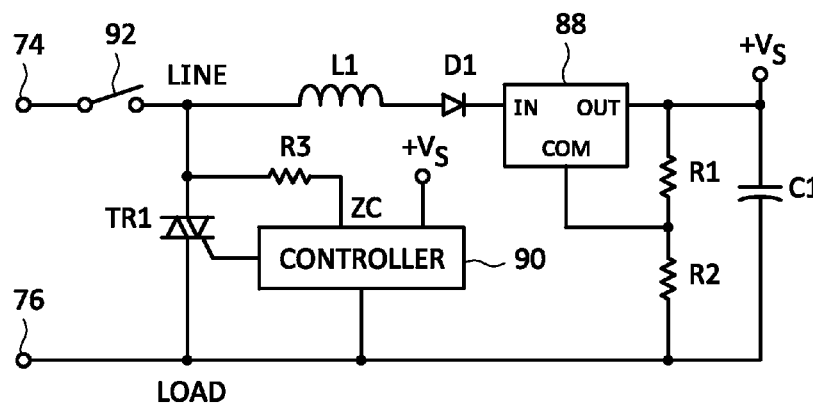
FIG. 23 illustrates another example embodiment of a two wire according to some inventive principles of this patent disclosure.

FIG. 23 illustrates another example embodiment of a two wire dimmer in which an active power supply is implemented with a linear regulator according to some inventive principles of this patent disclosure. The embodiment of FIG. 23 includes an inductor L1 and rectifier D1 to reduce and rectify the input voltage to a level and form suitable for a three terminal voltage regulator 88. Divider resistors R1 and R2 set the output voltage of the regulator which is filtered by capacitor C1 to provide the supply voltage $+V_S$. The supply voltage is used by a controller 90 to gate Triac TR1 or other latching switch. Another resistor R3 divides the input voltage to provide a zero cross signal ZC to the controller. A mechanical switch 92 may be included to provide a manual air gap disconnect.

Some additional inventive principles of this patent disclosure relate to asymmetric gating of switches during different half cycles. The amount of power transferred to a load is maximized when the switch is gated as close as possible to a zero crossing or other point of maximum power. The ability to actually gate a switch at this point, however, may be limited by various practical considerations such as the amount of power consumed by the gate drive circuit. This may be especially problematic with two-wire phase control devices where the power supply for the control circuit is derived from the two main terminals for the power switch. Gating one or more switches at different times during different half cycles may help maximize the power transferred to a load while still accommodating the generation of a power supply.

Figure 24:
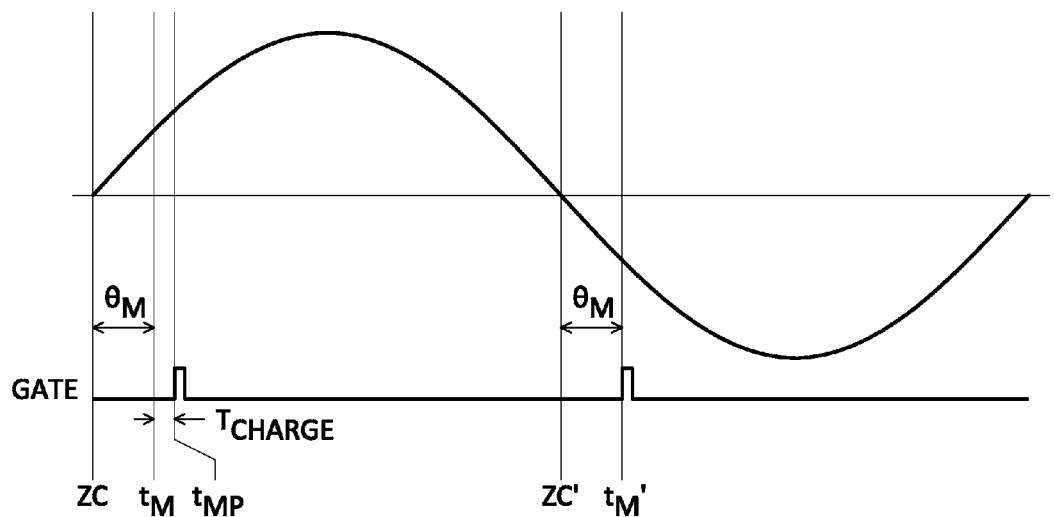
FIG. 24 illustrates an embodiment of a method for gating a switch according to some inventive principles of this patent disclosure.

FIG. 24 illustrates an embodiment of a method for gating a switch according to some inventive principles of this patent disclosure. The method is illustrated in the context of a Triac having a single gate signal GATE, but the inventive principles may be applied to any type of phase control system having any number or type of switching devices such as back-to-back SCRs, transistors, etc. In the embodiment of FIG. 24, $\theta_M$ represents a firing angle, corresponding to time $t_M$, at which maximum power is transferred to the load during the positive half cycle. In the case of an incandescent lamp or other resistive load, $\theta_M$ may be zero, in which case $t_M$ would be right at the zero crossing ZC. With a CFL or other capacitive load, $t_M$ is typically shifted somewhat from the zero crossing as shown in FIG. 24. The time $t_M'$ represents the same firing angle $\theta_M$, but for the negative half cycle.

In the embodiment of FIG. 24, the Triac is gated at different times during alternate half cycles. During the positive half cycle, the gate pulse is delayed from the maximum power point by a delay time of $T_{CHARGE}$. This time delay may enable a power supply to draw enough charge from the terminals of a two wire device to last through the positive and negative half cycles. Therefore, during the negative half cycle, the Triac may be gated right at the maximum power point $t_M'$.

Depending on the type of load, load inertia, etc., the difference in firing angle during alternate half cycles may be imperceptible to a user and/or harmless to a load. For example, with an incandescent lamp or CFL, the integrating capability of human vision may prevent any flicker or difference in light level during alternate half cycles from being visible. This may extend the effective dimming range of a lamp because more power is transferred to the load during the negative half cycle than would be possible if the time delay was included in the negative half cycle. Thus, the extra energy available to the load during the negative half cycle may compensate for all or a portion of the load energy lost because of the time delay during the positive half cycle.

The delay time $T_{CHARGE}$ may be fixed or variable and may be set to any suitable length and/or position in the line cycle. One or more time delays may be used with multiple phases. The inventive principles relating to asymmetric gating of switches are not limited to any specific applications. However, they may be especially beneficial when combined with a two wire device having a power supply fed by a half wave rectifier. For example, an asymmetric gating technique may be readily implemented with the embodiment of FIG. 23 because the power supply only draws charge from the line during positive half cycles. The power supply is already capable of lasting through a combined positive and negative half cycle. Thus, the Triac may be gated at the maximum power point, thereby transferring more power to the load than would be possible with symmetric gate pulses.

In another embodiment according to some inventive principles of this patent disclosure, a system includes: a latching switch in a field installable control apparatus adapted to be coupled between an AC power source and a load, where the AC power source has a waveform with cycles; and a controller coupled to the latching switch and adapted to vary the amount of power delivered to the load by varying the points in the cycles at which the control pulses are applied to the latching switch; where the durations of the control pulses depend on the points in the cycles at which the control pulses are applied to the latching switch.

In another embodiment according to some inventive principles of this patent disclosure, a system includes: a phase control device having a latching switch in a field installable control apparatus configured to control the flow of power from an AC power source to a load, where the latching switch has a variable operating point corresponding to a point on a waveform of the AC power source at which the latching switch is switched on, and where the operating point may vary over an operating range between first and second limits; and a controller coupled to the latching switch and adapted to place the phase control device in an adjustment mode, adjust the operating point of the phase control device to select at least one of the first and second limits, and adaptively constrain the operating point to prevent the latching switch from failing to latch during a line cycle of the waveform while in the adjustment mode.

In another embodiment according to some inventive principles of this patent disclosure, a system includes: a latching switch in a field installable control apparatus configured to control the flow of power from an AC power source to a load, where the latching switch has a variable operating point corresponding to a point in a cycle of a waveform of the AC power source at which the latching switch is switched on, and where the operating point may vary over an operating range having a lower limit corresponding to a point in the cycle that provides minimum power flow; and a controller coupled to the latching switch and adapted to determine the lower limit by sensing a point in the cycle at which the latching switch becomes nonconductive when the switch is switched on at a point substantially earlier in the cycle than the lower limit.

In another embodiment according to some inventive principles of this patent disclosure, a system includes: a switch in a field installable control apparatus adapted to be coupled between an AC power source and a load, the AC power source having a waveform with a first portion having a first polarity and a second portion having a second polarity; and a controller coupled to the switch and adapted to apply a control pulse to the switch during the first portion of the waveform at a first point after the beginning of the first portion of the waveform, and apply a control pulse to the switch during the second portion of the waveform at a second point after the beginning of the second portion of the waveform; where the time between the first point and the beginning of the first portion of the waveform is substantially different than the time between the second point and the beginning of the second portion of the waveform.

Although the inventive principles described herein are not limited to implementation in any particular form, some of the principles may be especially beneficial for implementation as wiring devices for buildings. Wiring devices tend to have significant constraints on size, cost, power dissipation, etc., because of the need for installation in electrical boxes, the price sensitivity of construction and remodeling projects, labor costs, etc. The inventive principles described herein may enable the realization of highly effective phase control solutions that provide high levels of performance while still accommodating the constraints place on wiring devices.

The inventive principles described in this patent disclosure may include methods and apparatus having functionality that may be implemented in any suitable manner including analog and/or digital hardware or hybrids thereof, software, firmware, or any combination thereof, etc.

Some of the inventive principles have been described in the context of single phase dimming systems, but the inventive principles may also be applicable to other types of phase control applications such as motor speed control for fans, pumps, etc., heating applications, etc. Thus, the terms dimmer and dimming are understood to include to any power control applications using the inventive principles described in this patent disclosure. The terms gate, gate pulse, gate signal, etc., refers not only to gates of Triacs, SCRs, FETs, etc., but also to any control signals, terminals, etc., for any type of power switches such as bipolar junction transistors (BJTs), relays, etc.

The inventive principles of this patent disclosure have been described above with reference to some specific example embodiments, but these embodiments can be modified in arrangement and detail without departing from the inventive concepts. Thus, any changes and modifications are considered to fall within the scope of the following claims.

What is claimed is:

1. An apparatus to control an amount of current delivered from an AC power source to an electrical load, the apparatus comprising:
    a line terminal configured to be connected to the AC power source;
    a load terminal configured to be connected to the electrical load;
    a controllably conductive power switch in series electrical connection between the line terminal and the load terminal; and
    a switching circuit configured to provide phase control of the controllably conductive power switch so as to control the amount of current delivered to the electric load, wherein the switching circuit is also configured to automatically detect at least one of:
        the conductive state of the controllably conductive power switch; and
        a type of electrical load connected to the load terminal;
    wherein the switching circuit is further configured to:
    apply a control pulse to the controllably conductive power switch at a first firing angle during a first period of time;
    apply the control pulse to the controllably conductive power switch at a test firing angle during a subsequent, second period of time;
    sense whether the controllably conductive power switch remains conductive after application of the control pulse at the test firing angle;
    wherein if the controllably conductive power switch does not remain conductive, incrementing the test firing angle by a predetermined amount and repeating application of a control pulse during a further subsequent period of time and sensing whether the controllably conductive power switch remains conductive; and
    wherein if the controllably conductive power switch remains conductive, set the test firing angle as a firing angle limit.

2. The apparatus of claim 1 wherein the switching circuit is configured to automatically detect the current flow between the line and load terminals.

3. The apparatus of claim 2 wherein the switching circuit is configured to automatically detect one or more of the maximum and minimum current flow between the line and load terminals.

4. The apparatus of claim 1, wherein the controllably conductive power switch is selected from the group consisting of a thyristor, a transistor, and a relay.

5. The apparatus of claim 4 wherein the controllably conductive power switch is a thyristor selected from the group consisting of a triac, an SCR, and a gate turn-off thyristor.

6. The apparatus of claim 4 wherein the controllably conductive power switch is a transistor selected from the group consisting of a bi-polar junction transistor and a field effect transistor.

7. The apparatus of claim 1, wherein the switching circuit includes one or more of measurement and control circuitry.

8. The apparatus of claim 7 wherein the controllably conductive power switch includes a gate and the switching circuit includes a gate drive circuit, the gate drive circuit being configured to apply a control pulse to the gate to control the conductive state of the controllably conductive power switch.

9. The apparatus of claim 1, wherein when the application of the control pulse during the first period of time further comprises applying the control pulse within one quarter of a half cycle after a zero crossing point of the AC power source waveform to provide a maximum amount of current to the electrical load.

10. The apparatus of claim 1, wherein when application of the control pulse during the second period of time further comprises applying the control pulse after one quarter of a half cycle after a zero crossing point of the AC power source waveform to provide a lower than maximum amount of current to the electrical load.

11. The apparatus of claim 1, wherein the test firing angle is greater than the first firing angle.

12. The apparatus of claim 1, wherein the first firing angle is retrieved from a look up table.

13. The apparatus of claim 1, further comprising:
    a current sensor having an output signal indicative of an amount of current flowing through the controllably conductive power switch; and
    the switching circuit further comprising a controller in electrical communication with the current sensor, the controller configured to receive the output signal and determine a state of the controllably conductive power switch.

14. The apparatus of claim 13, wherein the controller comprises one of a series sense resistor, a Hall effect detector, and a current transformer.

15. The apparatus of claim 13, wherein the current sensor is integrated with the controller.

16. The apparatus of claim 13, wherein the current sensor is separate from the controller.

17. An apparatus to control an amount of current delivered from an AC power source to an electrical load, the apparatus comprising:
   a line terminal configured to be connected to the AC power source;
   a load terminal configured to be connected to the electrical load;
   a controllably conductive power switch in series electrical connection between the line terminal and the load terminal;
   a switching circuit configured to provide phase control of the controllably conductive power switch so as to control the amount of current delivered to the electric load, wherein the switching circuit is also configured to automatically detect at least one of:
      the conductive state of the controllably conductive power switch; and
      a type of electrical load connected to the load terminal; and
   a wireless interface, the wireless interface configured to establish a wireless communication link with a remote device;
   wherein the apparatus is further configured to:
   receive a first mode signal through the wireless communication link;
   enter into an adjustment mode in response to the received first mode signal;
   receive, through the wireless communication link, an adjustment to an operational parameter of the apparatus;
   receive a second mode signal through the wireless communication link; and
   enter into an operating mode in response to the received second mode signal.

18. The apparatus of claim 17, wherein the operational parameter of the apparatus is one or more of a dimming level adjustment, a minimum brightness level adjustment, and a maximum brightness level adjustment.

19. An apparatus to control an amount of current delivered from an AC power source to an electrical load, the apparatus comprising:
   a line terminal configured to be connected to the AC power source;
   a load terminal configured to be connected to the electrical load;
   a controllably conductive power switch in series electrical connection between the line terminal and the load terminal; and
   a switching circuit configured to provide phase control of the controllably conductive power switch so as to control the amount of current delivered to the electric load, wherein the switching circuit is also configured to automatically detect at least one of:
      the conductive state of the controllably conductive power switch; and
      a type of electrical load connected to the load terminal
   wherein the switching circuity is further configured to:
      apply a high firing angle control pulse to the controllably conductive power switch upon initial power up of the apparatus, wherein the high firing angle control pulse is applied within one quarter of a half cycle before a zero crossing point of an AC source power waveform;
      sense whether the controllably conductive power switch is conductive; and
      determine the type of electrical load based upon whether the controllably conductive power switch remains conductive.

20. The apparatus of claim 19, wherein the controllably conductive power switch is a thyristor and wherein the type of electrical load is determined to be a non-incandescent electrical load if the thyristor does not remain conductive.

21. The apparatus of claim 19, wherein the controllably conductive power switch is a thyristor and wherein the type of electrical load is determined to be incandescent if the thyristor does remain conductive.

22. The apparatus of claim 19, wherein the controllably conductive power switch is a transistor and the determining the type of electrical load comprises measuring an amount of load current.

23. An apparatus to control an amount of current delivered from an AC power source to an electrical load, the apparatus comprising:
   a line terminal configured to be connected to the AC power source;
   a load terminal configured to be connected to the electrical load;
   a controllably conductive power switch in series electrical connection between the line terminal and the load terminal; and
   a switching circuit configured to provide phase control of the controllably conductive power switch so as to control the amount of current delivered to the electric load, wherein the switching circuit is also configured to automatically detect at least one of:
      the conductive state of the controllably conductive power switch; and
      a type of electrical load connected to the load terminal;
   wherein the switching circuit is further configured to:
      apply a first control pulse to the controllably conductive power switch at a first firing angle during a positive half cycle of an AC power source, the first firing angle corresponding to a first amount of current that is less than the maximum amount of current that can be provided to the electrical load; and
      apply a second control pulse to the controllably conductive power switch at a second firing angle during a negative half cycle of the AC power source waveform, the second firing angle corresponding to a maximum amount of current provided to the electrical load.

24. The apparatus of claim 23 wherein during the positive half cycle of the AC power source waveform, a second amount of current is provided to an apparatus, the second amount of current being the difference between the maximum amount of current and the first amount of current.

* * * * *